Nov. 19, 1940.  J. P. TENNEFOS  2,222,381
HINGED BELT COUPLER
Filed Sept. 18, 1939
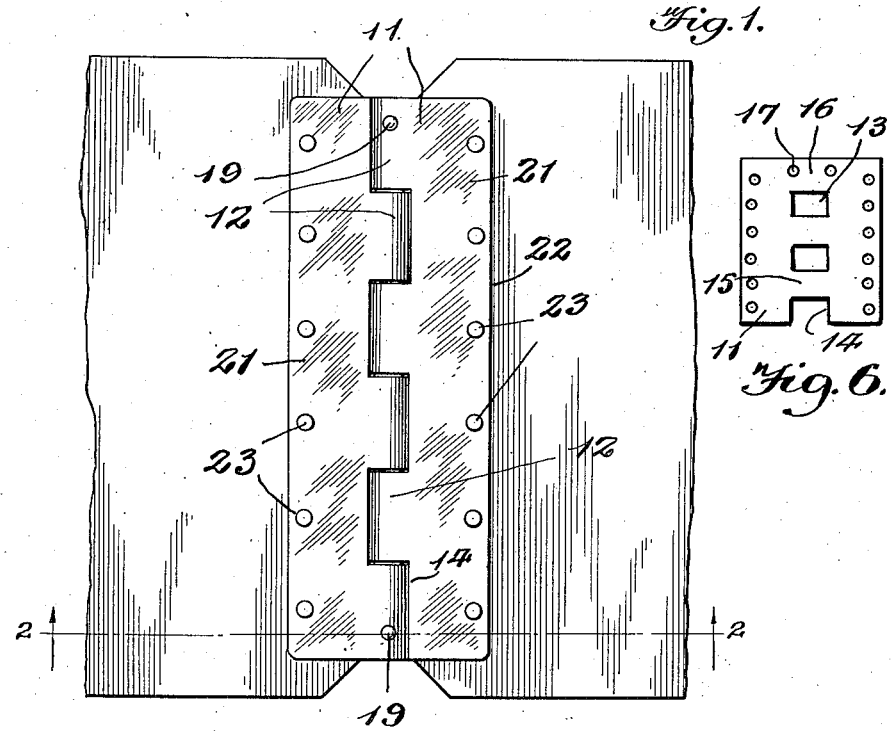
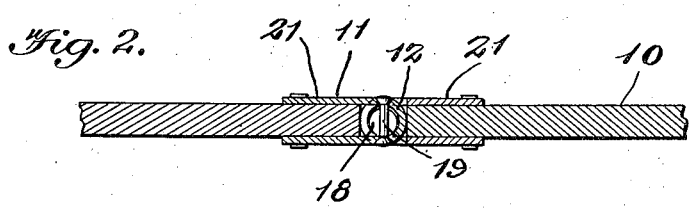
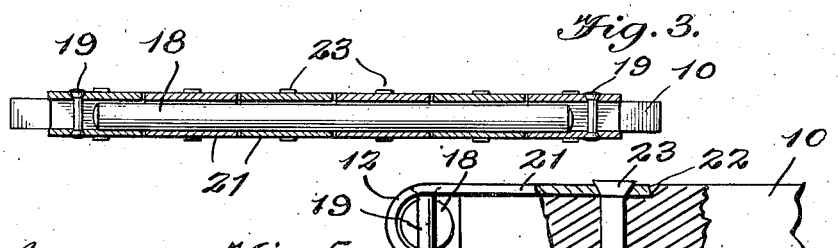
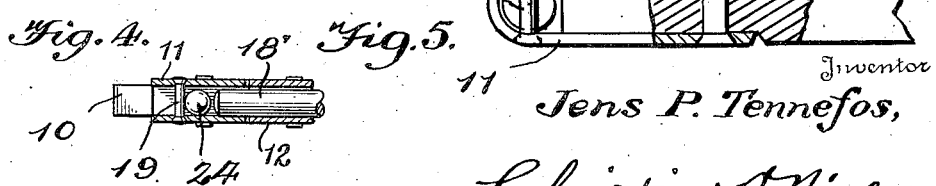
Inventor
Jens P. Tennefos,
By Christian R. Nielsen
Attorney Patented Nov. 19, 1940

2,222,381

UNITED STATES PATENT OFFICE 2,222,381

HINGED BELT COUPLER

Jens P. Tennefos, Fargo, N. Dak.

Application September 18, 1939, Serial No. 295,515

2 Claims. (Cl. 24—33)

The invention relates to belt couplings, and particularly to couplings suitable for heavy duty conveyor belts and the like, as well as power transmission belts, and has for an object to present a construction and arrangement whereby the life of the coupling in such belts, particularly conveyor belts, is greatly extended.

In such belts heretofore it has been a practice to utilize two coupling members corresponding to hinges, in which the knuckle elements of one coupling member intermesh with the other, and receive therethrough a common bolt. It has been a practice to secure these bolts in such manner that they remain in one position throughout the life of the coupling, and so finally become worn at opposite sides so that the knuckle elements set in grooves therein, so that wear soon becomes excessively appreciable, and in addition, making it very difficult to remove the pin when that becomes necessary, owing to the complicity of shoulders formed beside the groove elements tending to hook on the knuckle members and prevent withdrawal of the pin. The wear between the pin and the knuckles being localized at one part of the pin, it will be readily appreciated that the pin will thereby be much more rapidly worn and the relative separation of the connected ends of the belt will also be greatly augmented. It is therefore an aim of my invention to present a coupling of this type in which the pin will rotate, and so the wear thereof will be distributed throughout its circumference, lessening the relative separation of the connected ends to approximately one-quarter the distance involved where the same amount of material is lost with the localized wear previously referred to.

As shown in prior devices, as for instance, the patent to Wilkinson, 1,075,078, the pintle is formed with means which keep it in one position in the coupling, and also represents a danger of injury to pulley faces and interference with the proper action of the belt, in case projections on the pins become disturbed in their proper arrangement and engaged against the face of pulleys and the like. It is an important object of my invention to eliminate entirely projections from the pintle.

Additional objects, advantages and features of invention reside in the construction, arrangement and combination of parts involved in the embodiment of the invention, as will be more readily understood from the following description and accompanying drawing, wherein Figure 1 is a plan view of a coupling embodying my invention, Figure 2 is a section thereof on the line 2—2 of Figure 1.

Figure 3 is a section on the axis of the pintle,

Figure 4 is a fragmentary view similar to Figure 3 showing a modification.

Figure 5 is an enlarged edge view of one section of belt with my coupling element attached.

Figure 6 is a plan of the blank for the hinge members.

There is illustrated a belt 10, two ends of which are brought into close alinement and connected by respective hinge knuckle elements 11, which are of identical construction. Each knuckle element is formed from a single blank of sheet metal, stamped and bent into a substantial U-shape to form a plurality of knuckles 12 at the bight portion, the spacing of the knuckle elements being the same as the width of the knuckles, so that by bringing the two bight portions together in proper position, the knuckles of one will snugly interfit with the knuckles of the other. The knuckles may be in proper number to transmit from the belt properly. As shown in Figure 5, each hinge member is formed from a blank of sheet metal stamped with two rectangular openings 13 therein, and a corresponding crenelle 14 at one edge, the crenelle being of the same depth as the minor width of the apertures 13, and having a length along the respective edge of the blank the same as the corresponding length of the apertures 13. Bars 15 are thus formed between the apertures, and between one aperture and the crenelle 14, and the edge portion of the blank at the side opposite the crenelle is of the same width as the bars 15. The apertures 17 are formed in the outer bar 16 comprising the edge portion of the blank, and when the blank is bent into proper U-shape form, the two apertures 17 come into alinement with each other on a diameter of the hinge axis formed when the parts are assembled as will be described.

A pintle 18 is provided, of a length slightly less than the distance between the middle parts of the two outermost knuckles 12 when the hinge elements are mutually connected, as shown in Figure 1, and being of a diameter to fit revolubly within the bight portions of the two hinge members when meshed as shown in Figure 1, so that the knuckle portions will fit loosely thereagainst. The bending of the knuckles is preferably carefully effected so as to form a semicylindrical bight portion, adapted to fit the pintle 18 to best advantage. After the pintle is put in place, rivets 19 are engaged through the registered apertures 17 and upset, so as to retain the pintle against longitudinal movement from proper operative position.

The plates 21 formed by the bending of the hinge members may be variously formed, but as shown are simple rectangular elements each having a rectilinear edge 22 which will extend transversely of the belt. In close relation to this edge a series of countersunk apertures is formed in the two plates, of each member, the apertures of one plate registering with those of the other, being intended to receive rivets 23 therein, as shown in Figures 1 and 4, to secure an inserted belt end in the hinge member, as will be understood.

In the use of this device, the coupling is made of a length preferably less than the width of the belt 10 to be connected, although this is not essential in all cases. In order to connect the device, the respective end portions of the belt are trimmed on a line at right angles to the medial longitudinal line of the belt, and the corners may be bevelled or not, as indicated in Figure 1. The respective hinge elements 11 are then adjusted on the ends of the belt, so that the belt is set between the plates 20 formed by the bending of each hinge member, the transverse edge of the belt stopping short of the bight portion of the knuckles 12 sufficiently to permit the knuckles of the opposed hinge member to be inserted therebetween readily.

Great care should be taken to secure the hinge members upon the belt accurately upon a line transverse to the direction of the belt. And when this is assured, the rivets 23 are engaged through the plates 21 and interposed belt, and properly upset with sufficient pressure to forcibly clamp the belt between the plate members 21.

In the application of this coupling, the hinge members may be in separated relation and applied to the belt ends separately, and then the belt ends drawn together with any usual belt stretcher or tightener, so that the hinge members may be properly meshed and the pintle inserted. One of the rivets 19 may be put in place before this last operation, and the other afterward. An alternative method consists in having the hinge members assembled together with the pintle in place and the rivets 19 also, and my device applied to the belt while the hinge members are in coupled relation. One of the hinge members may be attached to a belt end before the belt is stretched, and then the belt properly engaged with the stretching device so that the ends may be brought together and the unattached belt end inserted in the remaining hinge member of the coupling, and the rivets then inserted and upset.

In Figure 4 there is shown a modification of the device in which a ball bearing 24, of the same diameter as the pintle 18' here shown is inserted in the outermost knuckle at one side of coupling, and inwardly of the respective adjacent rivets 19, the other parts in the device being the same as before described.

My invention may be made in various forms to fit the different requirements of use, and may also be adapted to use upon endless trough conveyor belts which are run between centrally grooved or recessed rollers, or between inclined rollers, whereby the sides of the belt are turned upwardly to retain loose material carried upon the belt. For flat belts the hinge members and pintles may be continued entirely thereacross, or a plurality of short units may be connected thereacross, in cases where there are likely to be irregularities in the transverse forms of the belt for any reason, and especially in the case of trough belts, two or three coupling sections may be used end to end across the belt with sufficient spacing to permit the transverse flexure of the belt, as may be required.

While I have described a specific embodiment of the invention, with great particularity, it will be understood that various modifications in construction, form and arrangement may be made therein without departing from the spirit of the invention or its scope, as more particularly set forth in the appended claims.

I claim:

1. A coupling of the character described for belts comprising hinge members U-shaped in cross section and adapted to receive respective belt end portions therewithin and having knuckles at the bight portion adapted to intermesh with a like knuckle portion of similar members, a pintle laid commonly between the knuckles of two intermeshed hinge members stopping short of the outermost knuckle element thereon, rivet members engaged through said outer knuckles outwardly of the ends of the pin, said pintle and the bights of said knuckle portions being cylindrical and semi-cylindrical, respectively, and said pintle being of a size to lie loosely and revolubly within the knuckles as described.

2. The structure of claim 1, in which said pintle stops short of at least one of said rivets, and a ball bearing set in the bight carrying the rivet, said ball bearing being of the same diameter as the pintle.

JENS P. TENNEFOS.